United States Patent [19]

Jost et al.

[11] 4,405,463

[45] Sep. 20, 1983

[54] PROCESS FOR STABILIZING SILICA-RICH GEOTHERMAL BRINE TO PREVENT SILICA SCALING

[75] Inventors: John W. Jost, Santa Ana; William C. Lieffers, Fullerton; Olin D. Whitescarver, Indian Wells, all of Calif.

[73] Assignee: Union Oil Company of California, Los Angeles, Calif.

[21] Appl. No.: 318,127

[22] Filed: Nov. 4, 1981

[51] Int. Cl.$^3$ ............................ C02F 1/52; C02F 1/74
[52] U.S. Cl. .................................. 210/712; 60/641.2; 210/717; 210/722; 210/737; 210/747; 423/339; 423/632
[58] Field of Search ............... 210/709, 712, 717, 718, 210/721, 722, 724, 737, 747; 423/144, 339, 632; 60/641.2

[56] References Cited

U.S. PATENT DOCUMENTS

| | | | |
|---|---|---|---|
| 2,267,831 | 12/1941 | Liebknecht et al. | 210/717 |
| 2,447,511 | 8/1948 | Leaf | 210/721 |
| 3,681,238 | 8/1972 | Emmett | 210/722 |
| 3,757,516 | 9/1973 | McCabe | 60/26 |
| 3,951,794 | 4/1976 | Swearingen | 210/58 |
| 3,958,635 | 5/1976 | Zilch et al. | 166/244 |
| 4,016,075 | 4/1977 | Wilkins | 210/712 |
| 4,032,460 | 6/1977 | Zilch et al. | 252/8.55 |
| 4,127,989 | 12/1978 | Mickelson | 60/641 |

OTHER PUBLICATIONS

Betz et al., "Removal of Silica from Water by Hot Process," Ind. & Eng. Chem., Oct. 1940, 1323–1329.
"A Survey of Treatment Methods for Geothermal Fluids," Sidney L. Phillips et al., 1976, (Paper #SPE-6606), Amer. Inst. of Mining, Metallurgical and Petroleum Engineers, Inc.
"Scaling and Corrosion in an Experimental Geothermal Power Plant", H. K. Bishop, et al., 1976, Paper #SPE-6612, American Institute of Mining and Metallurgical and Petroleum Engineers, Inc.
"Disposal of Geothermal Waste Water by Reinjection," Sveinn S. Einarsson et al., Proceedings of the Second Annual Symposium on the Development and Use of Geothermal Resources, May 1975, San Francisco, CA, pp. 1349–1363.
"Environmental Aspects of the Multi-Purpose Development of Geothermal Resources," John S. Wilson, AIChE Symposium Series, vol. 170, No. 136, 1973, pp. 782–787.
"Geothermal Chemical Engineering", Robert C. Axtman, et al., AIChE Journal, (vol. 22, No. 5), Sep. 1976, pp. 817–878.
"Removal of Silica from Raft River Geothermal Water," D. C. Sueiu, et al., U.S. Department of Energy Report EGS-FM-5170, Jun. 1980.
"Field Evaluation of Scale Control Methods: Acidification," J. Z. Grens, et al., Geothermal Resources Council Transactions, vol. 1, May 1977, pp. 119–121.
"Sourcebook on the Production of Electricity from Geothermal Energy," Brown University, Mar. 1980, (DOE Publication DOE/RA/4051-1), p. 536.
"Sulfide Precipitation of Heavy Metals from High Salinity Geothermal Brine," R. W. Bartlett, et al., Geothermal Resources Council, Transactions, vol. 3, Sep. 1979.

Primary Examiner—Peter A. Hruskoci
Attorney, Agent, or Firm—Dean Sandford; Gregory F. Wirzbicki; Gerald L. Floyd

[57] ABSTRACT

A process for stabilizing silica-rich geothermal brine to prevent silica scaling comprises selectively providing a supply of ferric ions, allowing the silica-rich brine to combine with the ferric ions to form insoluble, iron-rich siliceous material and separating the insoluble siliceous material from the brine to form a brine having a silica content which is reduced below the saturation level required for substantially scale-free handling of the brine. In one embodiment of the process in which the brine contains sufficient dissolved ferrous ions, the process comprises selectively contacting the brine with an oxidizing agent, preferably by aerating the brine, to oxidize a selected portion of the ferrous ions to ferric ions, which then combine with silica to form the insoluble iron-rich siliceous material. The ferric ion content of an iron-deficient brine may be augmented by adding ferric and/or ferrous ions to the brine. Steam released by flashing the untreated brine may be used to heat the stabilized brine before disposal thereof, so as to increase the silica solubility and reduce the amount of silica required to be removed to prevent scaling.

35 Claims, 2 Drawing Figures

(SHEET-1)

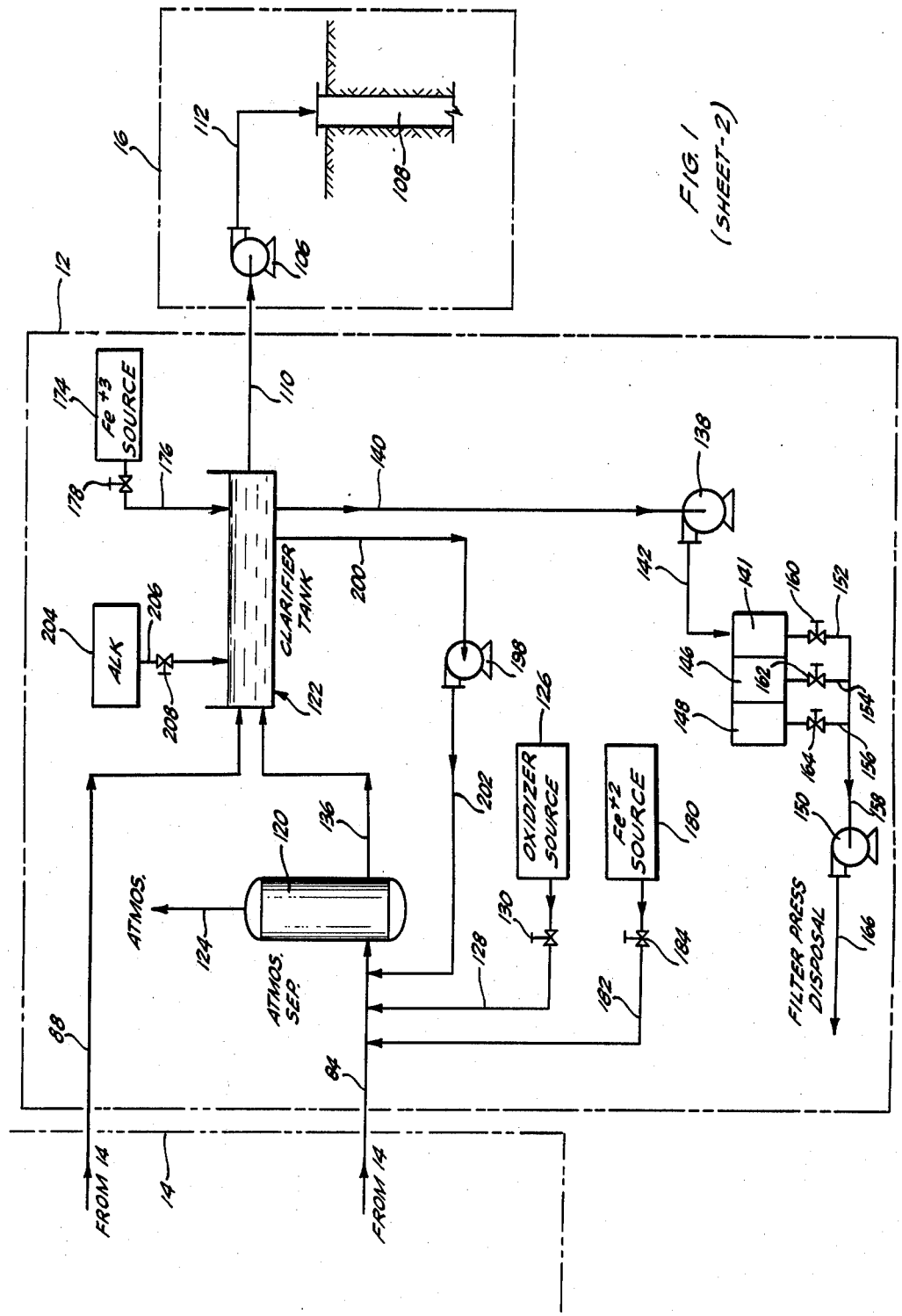
FIG. 1 (SHEET-2)

PROCESS FOR STABILIZING SILICA-RICH GEOTHERMAL BRINE TO PREVENT SILICA SCALING

BACKGROUND OF THE INVENTION

1. Field of the Invention

The present invention relates to processes for removing dissolved silica from geothermal liquids, particularly to prevent silica scaling in geothermal brine power plants and associated reinjection equipment.

2. Description of the Prior Art

Appreciable quantities of naturally occurring steam and/or hot aqueous liquid (geothermal fluids) can be found in many subterranean regions of the world. In general, these are regions where the thermal gradient of the earth's crust is abnormally high, as in areas of volcanic activity and along the Pacific Ocean rim.

Geothermal steam and hot water or brine, where readily available and advantageously located, have been used in several countries for direct heating, industrial processes and therapeutic purposes. However, a potentially much more important use for such geothermal fluids is for generation of electrical power, the use of which is less site restricted.

General techniques are known whereby geothermal steam and hot geothermal water or brine can be used for generating electric power. For example, geothermal steam after treatment to remove particulate matter and such gases as hydrogen sulfide can be directly used to drive steam turbine/generators, and high temperature geothermal water and brine may be flashed to extract steam which is then used to drive a steam turbine/generator. More moderate temperature geothermal water and brines may be used in binary heat recovery systems to vaporize a low boiling point working fluid, the resulting vapor being used to drive a gas turbine/generator.

However, in actual practice serious difficulties have typically been associated with obtaining the large quantities of more commonly found geothermal water (brine) necessary to operate competitively sized geothermal power plants, and particularly in handling and disposing of the usually heavily contaminated and frequently highly saline geothermal brines. As a result, the actual or projected costs of electricity generated from geothermal brines have generally not been competitive with cost of more conventionally produced power. These difficulties and high costs associated with geothermal brine electric power generation, coupled with heretofore abundant supplies of cheap hydrocarbon fuels, have tended to retard development of geothermal brine power plants.

Many of these serious problems encountered have been associated with disposal of the large volumes of brine effluent from even modest sized geothermal power plants. This geothermal brine effluent, which may typically be discharged at continuous rates of several hundred thousand pounds per hour, usually contains excessive levels of dissolved salts. Hence, the effluent usually cannot be further used for crop irrigation or the like and cannot, without further treatment, be safely discharged into water supplies.

Most geothermal brine effluent is consequently reinjected into the ground, usually so as to return to the geothermal reservoir from which it was extracted. Such reinjection also helps prevent ground subsidence over the reservoir, which might otherwise be caused by fluid extraction; further, reinjection to the reservoir tends to increase the amount of energy extractable therefrom.

Some of the most serious of these disposal problems have been associated with this reinjection of geothermal brine power plant effluents, particularly of flashed brine effluent, and have related to rapid scaling of reinjection equipment and wells. This is attributable to the fact that when hot geothermal brine (or other geothermal aqueous liquids) are flashed to a reduced pressure for extraction of steam, saturation levels in the brine of many scale-forming materials become exceeded. Instead of these scale-forming materials immediately precipitating, however, the brine tends to remain supersaturated, with the result that scale-forming precipitation occurs all along the subsequent brine flowpath. The resulting scale formation on exposed inner walls of downstream equipment and piping causes excessive maintenance requirements, and scale also tends to build up and choke-off the reinjection equipment and wells associated with the power plant, often at a rapid rate. The resultant reduction of brine flow through the power plant cuts power output and either necessitates periodic power plant shutdown for rework of the reinjection system or requires the costly provision of redundant reinjection facilities and wells.

Typically with silica-rich geothermal brines, representative of which are those found in the Imperial Valley of Southern California, silica scale buildup in the brine effluent reinjection system has often been so rapid that the associated power plants may need to be shut down for substantial periods every few weeks for reinjection system reconditioning. Not only is the scale, typically in the form of amorphous silicates, difficult, and hence expensive, to remove from reinjection equipment and piping, but costly drilling of new rejection wells may be required to replace badly scaled wells. In addition, costly power output interruptions result during associated power plant shutdown periods.

Prior art techniques for minimizing or inhibiting scaling, particularly silica scaling by silica-rich geothermal brines, have been successful only to varying degrees. In general, techniques which have shown some promise for reducing scale formation have heretofore been excessively costly. On the other hand, those which have been simple and inexpensive have heretofore usually been found to be relatively ineffectual at preventing downstream silica scaling. Thus, an important need exists for improved processes for treating silica-rich geothermal brines so as to prevent silica scaling, particularly in brine injection systems.

It is accordingly an object of the present invention to provide an effective, relatively inexpensive process for removing silica from silica-rich geothermal brines so as to substantially prevent downstream silica scaling.

It is another object of the present invention to provide an effective, economical and comparatively rapid silica removal process for stabilizing silica-rich geothermal brine so as to minimize brine residence time during the removal process.

It is still another object of the present invention to provide an effective, economical process for removing silica from silica-rich geothermal brine after flashing in a geothermal power plant so as to prevent silica-caused scaling in downstream brine effluent disposal portions of the power plant.

A yet further object of the present invention is to provide a silica removal process for stabilizing silica-rich geothermal brine which utilizes any indigenous ferrous iron dissolved in the brine in the removal process.

Additional objects, advantages and features of the invention will become apparent to those skilled in the art from the following description, when taken in conjunction with the accompanying drawings.

SUMMARY OF THE INVENTION

Briefly, the present invention provides for removing silica from silica-rich geothermal aqueous liquids, such as geothermal brine, by providing a controlled supply of ferric ions, allowing the ferric ions to combine with dissolved silica in the geothermal liquid so as to form insoluble, iron-rich siliceous material and then separating the insoluble siliceous material from the geothermal liquid to form a stabilized geothermal liquid having a reduced silica content. In particular, the process is effective for removing silica from silica-rich geothermal brine so as to provide substantially silica scale-free brine reinjection, or other disposal or use.

When the geothermal aqueous liquid contains ferrous ions, as is typical of many geothermal brines, the ferric ions used in the process are produced by selectively contacting at least a portion of the indigenous ferrous ions with an oxidizing agent, preferably air by aeration and/or air injection, so as to oxidize the ferrous ions to ferric ions.

If necessary to achieve the required amount of silica removal, the ferric ion content of the geothermal aqueous liquid may be augmented by adding ferric ions to the geothermal liquid and/or by adding ferrous ions to the geothermal liquid before the ferrous ion oxidization step.

In a geothermal brine power plant, wherein the geothermal liquid flow involved is flashed geothermal brine effluent supersaturated with silica due to the flashing operation for removing steam, the continuous silica removal process is controlled to reduce the silica level of the brine effluent below the saturation point for all conditions of brine effluent reinjection or other disposal. Also, when the flashed brine effluent to be treated is still under pressure, as is typical, the process includes additionally flashing the brine to substantially atmospheric pressure.

Provision may be included for recycling some of the acidic, stabilized geothermal liquid into untreated brine so as to inhibit upstream silica scaling by brine pH modification, dilution and/or silica seeding.

In a process variation, low pressure steam released during the atmospheric flashing of geothermal brine effluent is used to heat the stabilized geothermal brine before reinjection (or other disposition or use) so as to raise the silica solubility in the brine at all disposal or use conditions. This reduces the amount of silica required to be removed from the brine to prevent silica scaling.

The process provides economical, rapid silica removal and is adaptable for use in most geothermal aqueous liquid systems in which removal of silica from silica-rich geothermal liquids is required or desired.

BRIEF DESCRIPTION OF THE DRAWINGS

The invention will be more readily understood by reference to the drawings in which.

DETAILED DESCRIPTION OF THE INVENTION

The present process is effective for removing silica from silica-rich geothermal brine and is applicable to a wide variety of applications in which removing silica from geothermal brine or other liquids is desired or required. Illustrative of such applicability is removal of silica to prevent silica scaling in portions of geothermal power plants, both of two-phase (flashed brine) and binary types, as well as in other systems which use silica-rich geothermal liquids for heating or cooling or for other purposes. In addition, the present silica removal process can be used for recovery of salts or mineral species contained in geothermal aqueous liquids and which precipitate or are carried along with the iron-rich siliceous material precipitated by the process. Accordingly, although the invention will be hereinafter described with respect to a particular embodiment in which the process is used to continuously remove silica from a flow of silica-rich (supersaturated) flashed geothermal brine effluent from a geothermal brine electric power plant, so as to prevent silica scaling in brine reinjection portions thereof, the invention is not so limited.

Figure 1:
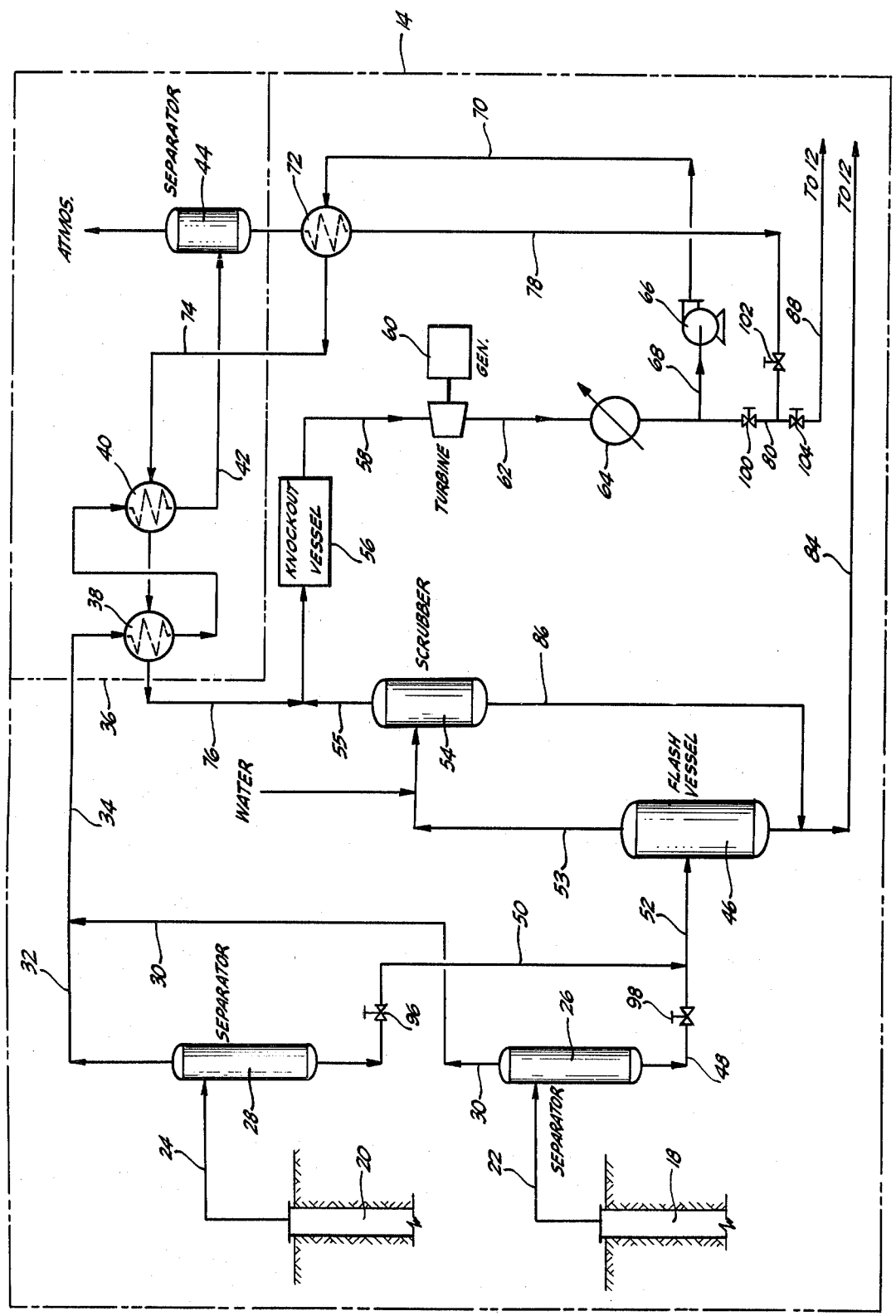
FIG. 1 is a schematic drawing showing in simplified form an exemplary flashed geothermal brine electric power plant in which the silica removal process, according to the present invention, is practiced to advantage.

Shown in simplified form in FIG. 1 is an exemplary geothermal brine power plant 10 which comprises generally silica removal system 12, in which the present process is performed, electricity generating system 14 and brine reinjection system 16.

For purposes of illustrating the invention, the geothermal brine used in power plant 10 is presumed sufficiently hot (for example, above about 350° F.) and under sufficient pressure (for example, one to five hundred psig) to enable steam extraction in power generating system 14 by flashing the brine to a reduced pressure. Also, as is typical of many geothermal brines, the brine is presumed to be rich not only in dissolved silica, primarily amorphous silica, but also in iron, principally in the ferrous ($Fe^{+2}$) ion state. Typical silica concentrations may be between about 350 and about 500 parts per million (ppm) and typical ferrous ion concentrations may be between about 40 and about 4000 ppm. Although, as will be seen from the ensuing discussion, high indigenous ferrous ion content is not required, the process is made more simple and economical by such ferrous ion content of the brine.

As more particularly described below, in silica removal system 12 at least a portion of the ferrous ions indigenous to the brine effluent flow from power generating system 14 is continuously and controllably oxidized so as to form ferric ($Fe^{+3}$) ions. These ferric ions are then permitted to combine or react with dissolved silica in the brine effluent flow to form an insoluble, iron-rich siliceous material, presumed to comprise principally iron-rich amorphous silicate, which is then separated from the brine effluent to provide a stabilized brine flow with a substantially reduced silica content.

In this respect, ferric ions have been found to cause very rapid silica precipitation as compared to the much slower precipitation rate of the natural amorphous silica polymerization process to which many silica scaling problems have been attributed, thereby enabling a short brine effluent residence time in system 12. Presence of ferrous ions in the brine does not, however, appear to result in formation of insoluble, iron-rich siliceous material, nor has the normal silica polymerization process been found to be affected by presence of ferrous ions.

Briefly described so as to facilitate an understanding of silica removal system 12 and the silica removal process performed therein, power generating system 14 is seen from FIG. 1 to include two geothermal brine extraction wells 18 and 20, which penetrate the earth to a geothermal reservoir (not shown). Typically, wells 18 and 20 would be several thousand feet deep. Only two wells, 18 and 20, are shown; however, more or less than the two shown may be required, according to particular power plant requirements.

Hot geothermal brine from wells 18 and 20 flows, ordinarily by natural pressure, through respective conduits 22 and 24 to well head separators 26 and 28, wherein non-condensible gases, such as carbon dioxide and hydrogen sulfide, are extracted from the brine. From separators 26 and 28, the noncondensible gases are flowed through respective conduits 30 and 32 and common conduit 34 to a gas venting system, shown generally as 36. In gas venting system 36 the noncondensible gases are carried through heat exchangers 38 and 40 for heat recovery therefrom and may then be directed through conduit 42 to separator 44 before being vented into the atmosphere.

Brine flows from separators 26 and 28 to flashing vessel 46 through respective conduits 48 and 50 and common conduit 52. Within flashing vessel 46, the brine is flashed to a lower pressure, for example to between about 100 and 150 psig, for steam extraction. Although only a single flashing vessel is shown, it is to be appreciated that, according to system requirements, several serially arranged flashing vessels may alternatively be used.

From flashing vessel 46, steam flows through conduit 53 to steam scrubber 54. Water for cleaning the steam may be fed into conduit 53 as shown. Steam from scrubber 54 flows through conduit 55 to liquid knockout vessel 56, and on through conduit 58 to steam turbine/electric generator 60 in which the steam is used to generate electric power.

Turbine/generator 60 discharges steam and/or condensate, depending on turbine type, through conduit 62 to condenser 64 associated with a cooling tower (not shown). From condenser 64, the condensate is fed by pump 66 from conduit 68 through conduit 70, through heat exchanger 72 in gas venting system 36 and on through conduit 74 to heat exchangers 40 and 38 for heat recovery from the noncondensible gases. Steam from heat exchanger 38 is fed through conduit 76 to combine with steam in conduit 54 upstream of knockout vessel 56. Liquid (sour condensate) from separator 44 is fed through heat exchanger 72 and conduit 78 to condensate conduit 80 which is connected to conduit 88.

Flashed brine from flashing vessel 46 will ordinarily, due to pressure and temperature drop therein, be supersaturated with amorphous silica, which, absent treatment or silica removal, starts polymerizing and precipitating to form silica scale in downstream piping and equipment. The super-saturated brine effluent is discharged through conduit 84 into silica removal system 12. Liquid from scrubber 54 is removed by conduit 86 and then usually combined with the brine in conduit 84.

Excess condensate from condenser 64 may be separately discharged through conduit 80 into silica removal system 12. Sour condensate discharged from heat exchanger 72 through 78 may, as shown, be fed into conduit 80. Alternatively, either or both of those condensates may be separately disposed of, as by being piped directly to brine reinjection system 16, in a manner not shown.

Fluid flow control in power generating system 14 is provided by valves 96, 98, 100, 102, 104 and others not shown as may be necessary for proper operation.

Comprising brine reinjection system 16 is brine reinjection pump 106 and reinjection well 108, which preferably penetrates the earth to the vicinity of the geothermal reservoir from which wells 18 and 20 extract brine. Pump 106 is flow connected between silica removal system 12 and reinjection well 108 by conduits 110 and 112 respectively. Although only one pump 106 and well 108 are shown, more than one of either or both may be provided, according to particular power plant flow requirements.

It is emphasized that configurations of power generating system 14 and brine reinjection system 16 do not form any part of the present silica removal process invention, systems 14 and 16 being generally illustrated and described only to the extent considered helpful to an understanding of the silica removal process and to illustrate how the process may be used to advantage. Consequently, no attempt has been made to show in detail or rigorously describe systems 14 and 16, although these systems are obviously important to operation of power plant 10.

As above mentioned, within silica removal system 12, silica is removed from brine effluent discharged thereinto from generating system conduits 84 and 88 by selectively providing a supply of ferric ions, preferably by oxidizing at least a portion of the ferrous ions indigenous to the brine, and then allowing these ferric ions to combine with silica in the brine effluent long enough to form the insoluble, iron-rich siliceous material. The insoluble siliceous material is then continuously separated from the brine so as to produce a stabilized brine flow with a reduced, and normally a substantially reduced, silica content. Brine effluent residence time in the silica removal system is such that sufficient silica is removed from the brine to reduce the silica content of the brine below the saturation level at reinjection conditions encountered in reinjection system 16.

Continuous production of ferric ions by oxidation of the indigenous ferrous ions in the brine flow is preferably accomplished by aeration or by adding air in any convenient manner to the brine effluent. The oxidation is believed to proceed according to the following reaction:

$$4Fe^{+2} + O_2 + 4H^+ \rightarrow 4Fe^{+3} + 2H_2O, \qquad (1)$$

the protons ($H^{3O}$) being indigenous to the geothermal brine.

Indications are that the ferric ions and water produced by reaction (1) combine to produce hydrated ferric oxyhydroxide, possibly through intermediate formation of ferric hydroxide, as shown in the following reaction, although actual existence of ferric hydroxide appears widely questioned:

$$Fe^{+3} + 3H_2O \rightarrow Fe(OH)_3 + 3H^+ \rightarrow FeOOH \cdot H_2O + 3H^+ \qquad (2)$$

From reactions (1) and (2) it can be determined that more protons are produced than are consumed, thereby resulting in a lowering of the pH of the geothermal brine.

Under the expected hot geothermal brine conditions, the hydrated ferric oxyhydroxide is presumably immediately ionized so as to provide a source of ferric ions for combining with the silica indigenous to the brine. Therefore, as described herein, the step of contacting ferrous ions in the brine with an oxidizing agent so as to produce ferric ions for combining with silica in the brine is to be considered as encompassing any intermediate reactions such as reaction (2).

The amorphous nature of silica in the brine, as well as that of the subsequently formed insoluble iron-rich siliceous material, makes accurate determination of both the chemical reactions involved and composition of the insoluble siliceous material difficult to determine accurately. These determinations are made additionally more difficult by the elevated temperature (typically about 100° F. to 200° F.) of the brine during the silica removal and by the usually complex composition of the brine.

However, analyses of the insoluble iron-rich siliceous material, including determinations that the ratio of iron-to-silicon molar quantities (mole ratio) of the iron-rich siliceous material is usually almost 1, indicate that silica (presumed to be in the form of silicic acid oligomers) may be precipitated by the hydrated ferric oxyhydroxide according to the reaction:

$$FeOOH \cdot H_2O + H_4SiO_4 \rightarrow FeH_3SiO_5 \downarrow + 2H_2O, \qquad (3)$$

the $FeH_3SiO_5$ being the insoluble iron-rich siliceous material believed to be formed.

However, possibly other reactions may alternatively or also occur which involve combining of the ferric ions with silica in the brine to form the insoluble iron-rich siliceous material. For example, although in general disagreement with an iron/silica mole ratio of about 1, there is some indication that the following reaction involving ferric ions and silicic acid oligomers may be involved in the silica removal process:

$$2Fe^{+3} + H_4SiO_4 + H_2O \rightarrow Fe_2O_3 \cdot SiO_2 \downarrow + 6H^+ \qquad (4).$$

Silica removal system 12 performs the present continuous process by providing atmospheric separator 120 and clarifier tank 122. The flow of flashed brine effluent from flashing vessel 46 is discharged through conduit 84 into lower regions of atmospheric separator 120, which is preferably of a generally conventional centrifugal entry type. Within separator 120 the brine effluent, which, as mentioned above, is still under pressure, typically between about 100 and 150 psig, is additionally flashed to substantially atmospheric pressure, thereby extracting additional steam from the brine. As shown in FIG. 1, this steam may be vented to the atmosphere through conduit 124.

Flashing the brine effluent in atmospheric separator 120 is preferable to flashing the brine to atmospheric pressure in an open tank (not shown), as may (otherwise) be done in alternative embodiments of the invention, since creation of usually objectionable mist over an open tank is avoided.

Within atmospheric separator 120 a portion of the ferrous ions indigenous to the brine effluent discharged thereinto may be oxidized to ferric ions by aeration. However, due to short brine residence time in separator 120, for example, considerably less than a minute, and minimal brine-to-air contact, the brine aeration in separator 120 is expected to be insufficient to oxidize a sufficient number of ferrous ions in the brine to remove enough silica from the brine to prevent downstream silica scaling. An advantage, however, of the very short brine effluent residence time in separator 120 is that insufficient time exists for forming the insoluble, iron-rich siliceous material therein.

To augment brine aeration in atmospheric separator 120, oxidizing agent source 126, preferably comprising compressed air, is provided. Oxidizing agent source 126 is flow connected into brine effluent discharge conduit 84, by means of conduit 128 and valve 130, just upstream of atmospheric separator 120. Valve 130 is adjusted to provide the amount of oxidizing agent needed to achieve the end result of reducing the brine effluent silica content below the saturation point during reinjection (or other disposal or use).

Preferably, for effectiveness of the present silica removal process, the elapsed time between the brine becoming supersaturated in silica and the formation or providing of ferric ions should be less than about 15 minutes and more preferably should be less than 5 minutes. Stated otherwise, the elapsed time between flashing of the brine for steam extraction, for example, in flashing vessel 46, and injection of air from source 126 and/or addition of ferric ions, as described below, should be less than 15 minutes and more preferably less than 5 minutes.

If the elapsed time between silica supersaturation and providing ferric ions exceeds these preferable elapsed times by any significant amount, polymerization of the silica in the brine may occur to such an extent that the silica no longer readily reacts or combines with the ferric ions, even though sufficient time may not have elapsed for the silica to polymerize to an extent that silica precipitation occurs. As an example, if silica supersaturated brine containing ferrous ions is discharged into an open pond in the usual manner suppressing mist over the pond, any oxidation of indigenous ferrous ions to ferric ions is very slow due to limited brine-to-air contact. Consequently the silica oligomers in the brine start polymerizing before any significant amount of ferric ions can be formed and the silica becomes nonreactive in respect to any ferric ions which are later formed. The silica polymerization process then dominates and the silica very slowly precipitates as the polymerization process continues. The rate of silica removal by such a normal silica polymerization process is extremely slow relative to the ferric ion silica removal process of the present invention and is too slow to be practical for most geothermal brine applications.

From atmospheric separator 120, the brine effluent is discharged through conduit 136 into clarifier tank 122, wherein additional brine aeration and ferrous ion oxidation occur and wherein the ferric ions combine or react (as described above) with the silica in the brine to form the insoluble, iron-rich siliceous material, which also precipitates from the brine in tank 122.

Preferably the combined condensates are also discharged from conduit 88 into clarifier tank 122 to enable preinjection combination of the condensates with the flashed brine effluent. As a result of combining these condensates, which ordinarily are rich in sulfides, with the flashed brine, which typically also contains heavy metals, insoluble metal sulfides are expected to precipitate with the insoluble iron-rich siliceous material formed according the present process. However, formation of these insoluble metal sulfides does not significantly effect operation of the silica removal process.

After the insoluble iron-rich siliceous material is separated from the brine effluent in clarifier tank 122, the clarified, stabilized brine, usually having a substantially reduced silica content, is discharged from tank 122 through conduit 110, to be pumped by pump 106 through conduit 112 into reinjection well 108.

Removal of the insoluble materials from clarifier tank 122 is accomplished by pump 138 which is flow connected to lower regions of tank 122 by conduit 140. The precipitates from tank 122 are pumped in the form of a slurry by pump 138 through conduit 142 to additional settling tanks 148, 146 and 141. Another pump 150, connected by conduits 152, 154 and 156, respectively, and common conduit 158, to tanks 146, 141 and 148, and flow controlled by valves 160, 162 and 164 in conduits 152, 154 and 156, delivers a concentrated slurry of precipitates from the tanks through conduit 166 to a disposal site or filter press, not shown.

Although many known silica-rich geothermal brines also contain sufficient ferrous ions to remove, through the described process, sufficient silica to ensure substantially scale-free brine reinjection or other disposal, some brines may contain insufficient ferrous ions. To accommodate such brines, the silica removal process performed in silica removal system 12 provides for increasing the concentration of ferric ions in clarifier tank 122 to the level required for substantially scale-free brine reinjection.

To this end, the ferric ion content in clarifier tank 122 may preferably be augmented by direct addition of a ferric compound which readily ionizes to provide ferric ions. A preferred ferric ion source is ferric chloride, which is readily available and comparatively inexpensive. Use of ferric sulfate is preferably restricted to those brines which do not contain substantial amounts of barium or calcium; otherwise large amounts of insoluble barium or calcium sulfates are formed, thereby adding to precipitate volume and precipitate disposal costs. To enable addition of ferric ions to clarifier tank 122, ferric ion supply 174 is flow connected with tank 122 through conduit 176 and flow control valve 178.

The process also, or alternatively, provides for addition of ferrous ions into brine discharge conduit 84, as may sometimes be preferable to addition of ferric ions to tank 122 from supply 174. A suitable ferrous ion producing compound is ferrous chloride, for the same reasons as set forth above for use of ferric chloride. As with ferric sulfate, use of ferrous sulfate is also preferably avoided. Ferrous ion supply 180, flow connected to conduit 84 by conduit 182 and flow control valve 184, may thus alternatively or additionally be provided.

Accordingly, if silica scaling, indicative of insufficient silica removal, occurs in brine effluent reinjection system 16, ferric and/or ferrous ions may be added from supply sources 174 and/or 180 until formation of silica scale ceases.

As above mentioned, as soon as the flashed brine effluent is discharged from flashing vessel 46 into conduit 84, silica scale may start forming in conduit 84 and in atmospheric separator 120 due to polymerization of amorphous silica in the brine. It has been found that such silica scale formation in conduit 84 and separator 120 may be substantially inhibited by recirculating or injecting some of the stabilized brine from clarifier tank 122 into conduit 84 upstream of separator 120, with the point of injection preferably being adjacent to flashing vessel 46.

Several mechanisms may be involved in inhibiting upstream silica scaling. The added volume of stabilized brine dilutes the untreated, flashed brine effluent, thereby reducing the extent of silica supersaturation in the untreated brine. Also, the stabilized brine may contain sufficient silica "seeds" onto which the polymerized silica tends to agglomerate rather than to form scale on equipment walls. Furthermore, the lower pH of the stabilized brine added (due to the above described proton increase during ferric ion formation) lowers the pH of the untreated brine, as may be beneficial in keeping silica from precipitating from the untreated brine. Therefore, the silica removal system preferably also provides pump 198, connected for pumping low pH, clarified brine from tank 122 through conduits 200 and 202, into conduit 84 just downstream of flashing vessel 46.

An adverse effect of low clarified brine pH, however, is that excessive equipment corrosion may be caused by the brine in reinjection system 16. Therefore, silica removal system 12 also provides for raising the pH of brine effluent in tank 122 sufficiently to prevent downstream corrosion problems. Source 204 of an alkaline material, for example, a sodium hydroxide or sodium bicarbonate solution, is thus flow connected with tank 122 by conduit 206 through flow control valve 208. Other suitable alkaline materials which may be used include potassium, magnesium and calcium hydroxides.

Figure 2:
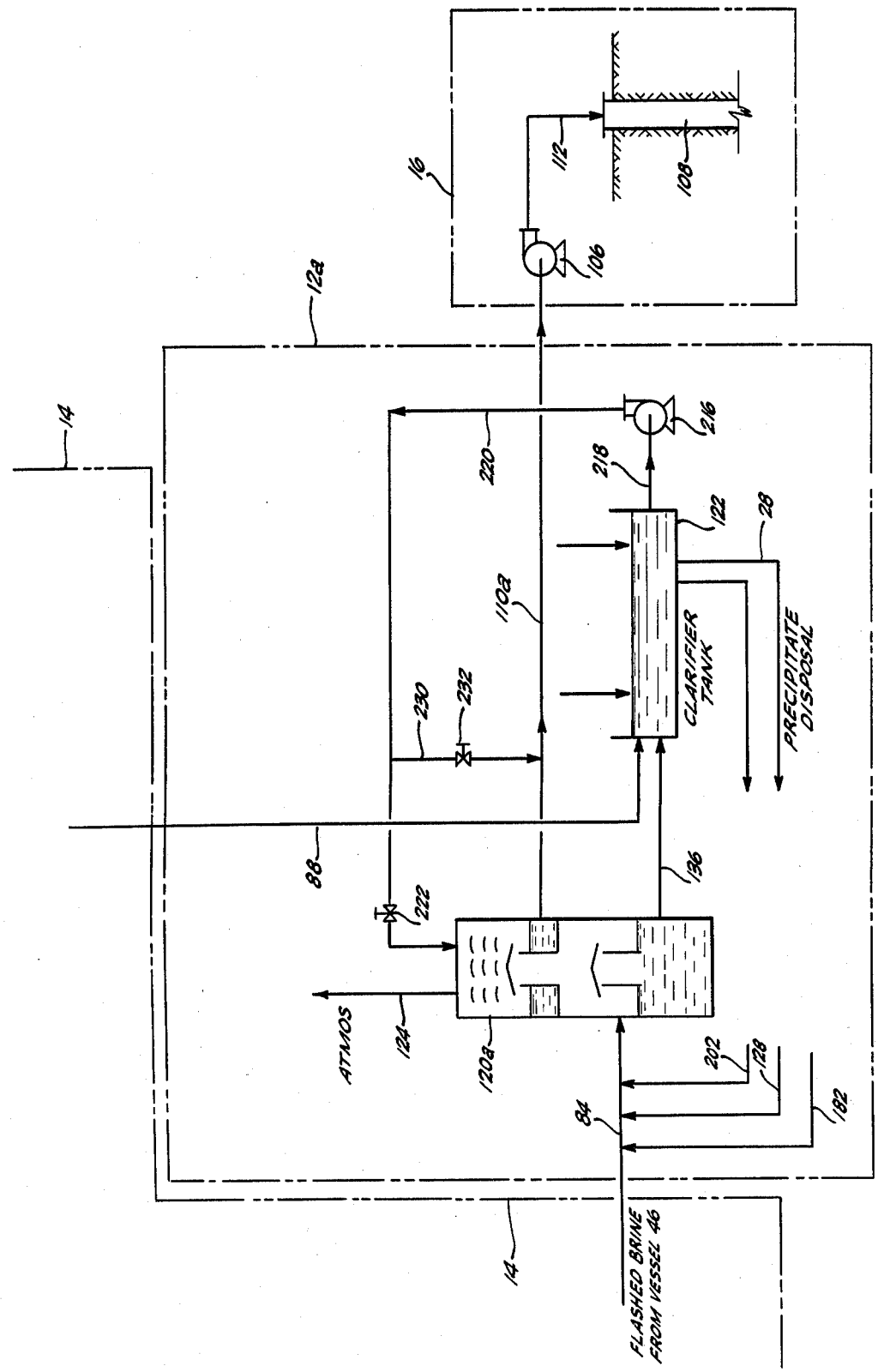
FIG. 2 is a variation of portions of the exemplary power plant of FIG. 1 in which the silica removal process is practiced.

In a variation silica removal system 12a, shown in FIG. 2, advantage may be taken of the heat content of the low pressure steam released from the brine effluent during flashing thereof to atmospheric pressure by replacing atmospheric separator 120 with combination heat exchanger/atmospheric separator 120a. Additional pump 216 is provided for pumping clarified brine from clarifier tank 122 into the top of heat exchanger/separator 120a, conduit 218 connecting pump 216 to tank 122 and conduit 220 connecting pump 216 to heat exchanger/separator 120a. Flow control valve 222 is installed in conduit 220. Conduit 220 discharges clarified brine from tank 122 into the top of heat exchanger/separator 120a so as to create a downward brine counter flow with respect to the rising steam released from the brine effluent discharged into heat exchanger/separator 120a.

Clarified brine, additionally heated in this manner by the low pressure steam, is discharged from heat exchanger/separator 120a through conduit 110a leading to brine reinjection pump 106 for reinjection into well 108.

Due to the temperature of the clarified brine being in this manner increased over that which it would otherwise be, the silica solubility is increased. This increase in silica solubility additionally assures that no silica scaling will occur during brine effluent reinjection and/or allows less silica to be removed in the silica removal process.

To enable bypassing heat exchanger/separator 120a, conduit 230 is connected between conduits 220 and 110a. Valve 232 in conduit 230 controls flow through conduit 230.

Other than as described above, silica removal system 12a is preferably identical to silica removal system 12 described in detail above. Therefore, these identical parts of system 12a have not been shown in FIG. 2 and are not described herein.

It can be appreciated from the foregoing description that many variable factors are associated with removing sufficient silica from silica-rich geothermal brine effluent to prevent or substantially reduce silica scaling in brine effluent disposal (or subsequent use) operations. These variables include brine temperature, pressure, pH, silica content, ferrous ion content, content of other materials which may enhance or inhibit silica precipitation, and flow rate. Still other variables include brine effluent disposal (or use) conditions such as changes in brine temperature, pressure and pH along the disposal (or use) path and brine residence time during disposal (or use). Amount of brine effluent aeration in atmospheric separator 120 or heat exchanger/separator 120a and clarifier tank 122 and brine residence time in each are also factors.

Therefore, for a particular geothermal brine source and power plant (or other brine application) configuration, adjustments of silica removal conditions, through adjustment of one or more of oxidizer source 126, ferric ion source 174, ferrous ion source 180, alkaline source 204 and/or brine recirculation pump 198 can be expected to be required. However, after initial adjustments are made to accommodate the particular brine and power plant (or other application) relatively few adjustments are required thereafter, since brine characteristics tend to remain substantially constant over long periods of time.

The invention will be further described with reference to the following Example.

EXAMPLE

As produced at the earth's surface (wellhead) from its source, for use in an approximately 10 megawatt demonstration geothermal brine power plant, having the general configuration of power plant 10 (FIG. 1) a typical group of geothermal brine supplies connected for supplying brine to a common power plant is found to have the following approximate ranges of characteristics at the wellheads:

| | |
|---|---|
| Temperature, °F. | 400 to 550 |
| Pressures, psig | 350 to 600 |
| pH, | 4.5 to 6.0 |
| Silica Content, ppm | 370 to 454 |
| Ferrous ion content, ppm | 48 to 3733 |
| Combined flow rate, Lbs./per hr. | 500,000 to 1,400,000 |

Brine effluent discharged from flashing vessel 46 through conduit 84 is found to have the following approximate ranges of characteristics:

| | |
|---|---|
| Temperature, °F. | 340 to 360 |
| Pressure, psig | 120 to 150 |
| pH, | 4.6 to 6.5 |
| Silica Content, ppm | 450 to 500 |
| Ferrous ion content, ppm | 2000 to 3000 |
| Flow rate, Lbs./per hr. | 425,000 to 1,190,000 |

Air at about 50 psig is injected into conduit 84 from oxidizing agent source 126 at a rate of between about 23 standard cubic feet per minute (SCFM) and about 79 SCFM.

Brine effluent residence time in clarifier tank 122 is between about 1.2 and about 1.7 hours. Within clarifier tank 122, the brine effluent is found to have the following approximate ranges of characteristics:

| | |
|---|---|
| Temperature, °F. | 160 to 200 |
| pH, | 3 to 5 |
| Silica Content, ppm | 90 to 150 |
| Ferrous ion content, ppm | 2000 to 3000 |
| Ferric ion content, ppm | 5 to 60 |

Within clarifier tank 122, the silica removed comprises between about 200 ppm and about 400 ppm and is removed at a rate of between about 85 pounds per hour and about 560 pounds per hour (dependent upon the silica removal rate and brine flow rate).

The minimum silica solubility in the brine effluent throughout reinjection by brine reinjection system 16 is determined to be between about 170 ppm and about 200 ppm. Consequently a silica content of stabilized brine in tank 122 below about 170 ppm is preferred and below about 150 ppm is more preferred. Excess silica precipitate formation in clarifier tank 122, is avoided by maintaining a silica content of clarified brine in tank 122 preferably above about 100 ppm. More preferably the silica content of clarified brine tank is maintained above about 140 ppm.

While particular embodiments of the invention have been described, it will, of course, be understood that the invention is not limited thereto, since many obvious modifications can be made, and it is intended to include within this invention any such modifications as will fall within the scope of the claims.

Having now described the invention, we claim:

1. A process for removing dissolved silica from a geothermal aqueous liquid also containing ferrous ions and having a pH of about 4.5 to 6.0, which comprises the steps of:
    (a) providing a controlled supply of ferric ions, including containing said ferrous ions in said geothermal aqueous liquid with an oxidizing agent so as to oxidize at least a portion of said ferrous ions to ferric ions;
    (b) allowing at least some of said ferric ions to combine with dissolved silica in said geothermal aqueous liquid so as to lower the pH of said geothermal aqueous liquid and form insoluble, iron-rich siliceous materials; and
    (c) separating said insoluble, iron-rich siliceous materials from said geothermal aqueous liquid so as to form a stabilized geothermal aqueous liquid having a reduced silica content and a pH of about 3 to 5.

2. The process defined in claim 1 wherein said contacting ferrous ions with an oxidizing agent includes aerating said geothermal aqueous liquid.

3. The process defined in claim 2 wherein said aerating of geothermal aqueous liquid comprises injecting air into said geothermal aqueous liquid.

4. The process defined in claim 1 wherein the step of selectively providing a supply of ferric ions includes adding ferric ions to said geothermal aqueous liquid so as to augment the ferric ions formed by oxidization of ferrous ions in said geothermal aqueous liquid.

5. The process defined in claim 1 wherein the step of selectively providing a supply of ferric ions includes adding ferrous ions to said geothermal aqueous liquid, at least a portion of ferrous ions from said addition of ferrous ions being selectively oxidized to form ferric iions.

6. The process defined in claim 1 further comprising the steps of (d) establishing a maximum allowable dissolved silica level for said stabilized geothermal aqueous liquid and (e) controlling said steps of selectively providing a supply of ferric ions and of combining said ferric ions with dissolved silica in said geothermal aqueous liquid so as to form a stabilized geothermal aqueous liquid having a silica content below said maximum allowable dissolved silica level.

7. The process defined in claim 6 wherein said preselected maximum dissolved silica level is no greater than the dissolved silica saturation level in the geothermal aqueous liquid for substantially all conditions associated with reinjection thereof.

8. The process defined in claim 7 wherein said preselected maximum dissolved silica level is below about 200 ppm.

9. The process defined in claim 7 wherein said preselected maximum desired dissolved silica level is below about 150 ppm.

10. The process defined in claim 1 further comprising the steps of (d) establishing a preselected minimum desired dissolved silica level in said geothermal aqueous liquid which is below the level of dissolved silica in said geothermal aqueous liquid as produced from its source and (e) controlling said steps of providing a supply of ferric ions with dissolved silica in said geothermal aqueous liquid so as to remove only that amount of silica from said geothermal aqueous liquid that the silica content in said stabilized aqueous liquid is above said preselected minimum desired dissolved silica level.

11. The process defined in claim 10 wherein said preselected minimum desired dissolved silica level is above about 100 ppm.

12. The process defined in claim 10 wherein said preselected minimum desired dissolved silica level is above about 140 ppm.

13. The process defined in claim 1 wherein said process further comprises adding to said stabilized geothermal aqueous liquid an alkaline material as necessary so as to maintain the pH of said stabilized geothermal aqueous liquid above a preselected minimum desired pH.

14. The process defined in claim 1 wherein said geothermal aqueous liquid is under pressure, and said process further comprising the step of flashing said geothermal aqueous liquid to substantially atmospheric pressure so as to extract additional steam from said geothermal aqueous liquid.

15. The process defined in claim 14 further comprising the step of heating said stabilized geothermal aqueous liquid by heat exchange with said released steam.

16. The process defined in claim 1 further comprising the steps of (d) establishing a preselected time period in which said ferric ions are allowed to combine with said dissolved silica so as to form insoluble iron-rich siliceous material, said established time period being less than about 2 hours, and (e) controlling said steps of providing ferric ions and allowing said ferric ions to combine with said silica so as not to exceed said established time period.

17. A continuous silica removal process for reducing the dissolved silica content of silica-rich geothermal brine also containing ferrous ions and having a pH of about 4.5 to 6.0, so as to enable substantially silica scale-free reinjection of said geothermal brine flow, said process comprising the steps of:

(a) continuously providing a supply of ferric ions, including contacting said ferrous ions in said brine with an oxidizing agent so as to oxidize at least a portion of said ferrous ions to ferric ions;
(b) continuously allowing said ferric ions to combine with said silica dissolved in said geothermal brine so as to lower the pH of said geothermal brine and form an insoluble, iron-rich siliceous material;
(c) continuously separating said insoluble, iron-rich siliceous material from said geothermal brine flow so as to form a stabilized geothermal brine flow having a reduced dissolved silica content and a pH of about 3 to 5; and
(d) controlling said providing of ferric ions said allowing of said ferric ions to combine with said dissolved silica and said continuously separating of and insoluble, iron-rich siliceous material from said geothermal brine flow so as to cause the dissolved silica content of said stabilized geothermal brine to be below a preselected silica level assuring substantially silica scale-free injection of said stabilized brine flow.

18. The silica removal process defined in claim 17 wherein said geothermal brine flow comprises flashed geothermal brine in which the dissolved silica is at a supersaturated level and wherein said preselected silica level in said stabilized brine is selected so that the silica concentration will not exceed the silica saturation level at any point during brine reinjection.

19. The silica removal process defined in claim 17 wherein said step of selectively contacting ferrous ions in said geothermal brine with an oxidizing agent includes injecting air into said geothermal brine.

20. The silica removal process defined in claim 17 wherein said geothermal brine is under pressure before said providing of ferric ions and further comprising the step of flashing said geothermal brine to substantially atmospheric pressure.

21. The silica process defined in claim 20 wherein said step of flashing of said geothermal brine extracts steam from said geothermal brine and further comprising the step of using said steam to heat said stabilized geothermal brine before reinjection thereof so as to raise said lowest silica solubility of said geothermal brine during said reinjection.

22. The silica removal process defined in claim 17 wherein the step of continuously providing a supply of ferric ions comprises one or more of the steps selected from the group consisting of (a') adding ferric ions to said geothermal brine and (a") adding ferrous ions to said geothermal brine and selectively contacting said added ferrous ions with an oxidizing agent so as to oxidize at least a portion of said added ferrous ions to ferric ions.

23. The silica removal process defined in claims 1 or 18 wherein said step of contacting said ferrous ions with an oxidizing agent results in forming hydrogen ions, thereby causing pH of said stabilized geothermal brine to be lower than pH of said untreated geothermal brine wherein said process further comprises the step of reducing the pH of said untreated geothermal brine by combining a portion of said stabilized geothermal brine with said untreated geothermal brine.

24. A continuous silica removal process for reducing the dissolved silica content of flashed geothermal brine from a geothermal brine power plant, said geothermal brine being still under pressure, being supersaturated after flashing with amorphous silica and having a substantial ferrous ion content and a pH of about 4.5 to 6.0, said process comprising the steps of:
(a) injecting air into said geothermal brine just upstream of an atmospheric separator, so as to oxidize a portion of said ferrous ions to ferric ions; said ferrous ion to ferric ion oxidation being caused to occur within a preselected time after said brine becomes supersaturated with silica;
(b) discharging said flow of aerated geothermal brine into said atmospheric separator, so as to additionally flash and brine to substantially atmospheric pressure, whereby releasing low pressure steam from said brine;
(c) discharging said flow of aerated geothermal brine from said atmospheric separator into a clarifier tank and allowing said ferric ions to combine with said amorphous silica in said geothermal brine so as to lower the pH of said geothermal brine and form insoluble, iron-rich amorphous siliceous materials;
(d) allowing said insoluble, iron-rich amorphous siliceous materials to precipitate in said clarifier tank so as to form a stabilized geothermal brine having an amorphous silica content reduced to a level preselected for enabling substantially silica scale-free reinjection of said stabilized brine and a pH of about 3 to 5;
(e) discharging a flow of said stabilized geothermal brine from said clarifier tank for reinjection through at least one reinjection well into a subterranean formation; and
(f) removing said insoluble iron-rich amorphous siliceous material from said clarifier tank.

25. The silica removal process defined in claim 24 wherein prior to reinjection of said stabilized brine into said reinjection well, said stabilized brine is passed in heat exchange relationship with said low pressure steam from said atmospheric separator.

26. The silica removal process defined in claim 24 further comprising the step of injecting a portion of said stabilized brine from said clarifier tank into said untreated brine so as to lower the pH of said untreated brine so as to inhibit polymerization of said amorphous silica dissolved therein.

27. The silica removal process defined in claim 24 further comprising the step of augmenting said ferric ions formed by oxidizing said ferrous ions by addition of ferric ions to said geothermal brine in said clarifier tank.

28. The silica removal process defined in claim 24 further comprising the step of augmenting the ferrous ion content in said geothermal brine by addition of ferrous ions to said geothermal brine upstream of the point at which air is injected into said goethermal brine.

29. A silica removal process for reducing the dissolved silica content of geothermal brine supersaturated in silica, said geothermal brine also containing ferrous ions and having a pH of about 4.5 to 6.0, said process comprising the steps of:
(a) aerating said geothermal brine so as to oxidize at least a portion of said ferrous ions contained therein to ferric ions;
(b) allowing said ferric ions to combine with said silica in said geothermal brine so as to lower the pH of said geothermal brine and form insoluble, iron-rich siliceous material;
(c) separating said insoluble, iron-rich siliceous material from said geothermal brine so as to form a stabilized brine having a reduced silica content, of a pH of about 3 to 5; and
(d) controlling said steps (a), (b) and (c) so as to cause said stabilized brine to be non-supersaturated in silica.

30. The silica removal process defined in claim 29 wherein said aerating step includes injecting air into said geothermal brine.

31. The silica removal process defined in claim 29 further comprising the step of adding ferric ions to said geothermal brine so as to augment the ferric ions provided by said oxidizing step.

32. The silica removal process defined in claim 29 wherein said geothermal brine is flashed to extract steam, said brine being supersaturated with silica after being flashed and wherein said controlling step includes oxidizing said ferrous ions-ferric ions within a preselected time after said brine becomes supersaturated with silica.

33. The silica removal process defined in claims 24 or 32 wherein said preselected time it less than about 15 minutes.

34. The silica removal process defined in claims 24 or 32 wherein said preselected time is less than about 5 minutes.

35. A silica removal process for reducing the silica content of geothermal brine having a pH of about 4.5 to 6 after said geothermal brine has become supersaturated in silica, said process comprising the steps of:
(a) providing a supply of ferric ions to said geothermal brine;
(b) allowing said ferric ions to combine with silica in said geothermal brine so as to lower the pH of said geothermal brine and form insoluble, iron-rich siliceous material;
(c) separating said insoluble, iron-rich siliceous material from said geothermal brine so as to form a stabilized brine having a reduced silica content and a pH of about 3 to 5; and
(d) controlling steps (a), (b) and (c) so as to remove sufficient silica from said geothermal brine to cause said stabilized brine to become non-supersaturated in silica for all brine injection conditions within less than about two hours after said brine has become supersaturated in silica, said controlling step including controlling step (a) so as to provide said ferric ions within less than about 15 minutes after said geothermal brine has become supersaturated in silica.

* * * * *